(12) United States Patent
Kim et al.

(10) Patent No.: US 11,913,787 B2
(45) Date of Patent: Feb. 27, 2024

(54) GROUND MARKING AERIAL TARGET FOR AERIAL SURVEY TRANSFORMABLE TO HAND-FAN SHAPE

(71) Applicant: NATIONAL DISASTER MANAGEMENT RESEARCH INSTITUTE, Ulsan (KR)

(72) Inventors: Seong Sam Kim, Ulsan (KR); Dong Yoon Shin, Ulsan (KR); Hyun Ju Nho, Ulsan (KR); Je Sung Park, Ulsan (KR); Hyun Ju Kim, Ulsan (KR)

(73) Assignee: NATIONAL DISASTER MANAGEMENT RESEARCH INSTITUTE, Ulsan (KR)

( * ) Notice: Subject to any disclaimer, the term of this patent is extended or adjusted under 35 U.S.C. 154(b) by 273 days.

(21) Appl. No.: 17/102,829

(22) Filed: Nov. 24, 2020

(65) Prior Publication Data

US 2021/0164780 A1     Jun. 3, 2021

(30) Foreign Application Priority Data

Dec. 2, 2019   (KR) .................. 10-2019-0158019

(51) Int. Cl.
| | |
|---|---|
| *G01C 15/06* | (2006.01) |
| *G01C 11/06* | (2006.01) |
| *G01C 11/04* | (2006.01) |
| *G06T 7/80* | (2017.01) |
| *G01C 11/00* | (2006.01) |

(52) U.S. Cl.
CPC .............. *G01C 15/06* (2013.01); *G01C 11/00* (2013.01); *G01C 11/04* (2013.01); *G01C 11/06* (2013.01); *G06T 7/80* (2017.01)

(58) Field of Classification Search
None
See application file for complete search history.

(56) References Cited

U.S. PATENT DOCUMENTS

| | | | | | |
|---|---|---|---|---|---|
| 835,761 | A | * | 11/1906 | Kendrick | ............... A45B 27/00 |
| | | | | | 416/73 |
| 1,963,558 | A | * | 6/1934 | Pesmen | .................. A45B 27/00 |
| | | | | | 416/212 R |

(Continued)

FOREIGN PATENT DOCUMENTS

| | | |
|---|---|---|
| JP | 2014-48163 A | 3/2014 |
| JP | 2019-35728 A | 3/2019 |
| JP | 2019074386 A * | 5/2019 |

*Primary Examiner* — Arleen M Vazquez
*Assistant Examiner* — Leonard S Liang
(74) *Attorney, Agent, or Firm* — NKL Law; Byungwoong Park

(57) ABSTRACT

The present disclosure provides a target for aerial survey transformable to hand-fan shape. In this instance, the target includes a central axis, a first identification marker with one end connected to the central axis and having a first length outwards, and a second identification marker with one end connected to the central axis and having a second length outwards, the second identification marker disposed on the first identification marker, wherein the second length is shorter than the first length, the first identification marker includes a plurality of first unit areas having a predetermined angle therebetween with respect to the central axis, and the plurality of first unit areas has an overlap between adjacent first unit areas.

2 Claims, 7 Drawing Sheets

(56) References Cited

U.S. PATENT DOCUMENTS

| | | | | |
|---|---|---|---|---|
| 5,967,161 | A  * | 10/1999 | Neal | A42B 1/201 |
| | | | | 416/70 A |
| 6,195,898 | B1 * | 3/2001 | Lemisch | B26B 3/06 |
| | | | | 30/255 |
| 6,415,734 | B1 * | 7/2002 | LaPuzza | G01C 15/02 |
| | | | | 428/181 |
| 2002/0159032 | A1 * | 10/2002 | Son | H04N 13/393 |
| | | | | 348/E13.056 |
| 2004/0141288 | A1 * | 7/2004 | Franz | G06F 1/20 |
| | | | | 361/695 |
| 2009/0133278 | A1 * | 5/2009 | Bonadiman | B44D 3/22 |
| | | | | 33/562 |
| 2012/0121380 | A1 * | 5/2012 | Tein | H02K 7/1876 |
| | | | | 415/4.2 |
| 2012/0166137 | A1 * | 6/2012 | Grasser | G01C 15/06 |
| | | | | 702/150 |
| 2015/0165896 | A1 * | 6/2015 | Nam | B60K 11/085 |
| | | | | 180/68.1 |
| 2017/0277180 | A1 * | 9/2017 | Baer | G05D 1/0038 |
| 2018/0259652 | A1 * | 9/2018 | Shimizu | G01S 17/89 |
| 2018/0274920 | A1 * | 9/2018 | Sasaki | G06T 7/73 |
| 2019/0204417 | A1 * | 7/2019 | Thompson | G01S 7/4802 |
| 2020/0065605 | A1 * | 2/2020 | Manako | G06T 7/62 |
| 2021/0062822 | A1 * | 3/2021 | Manchester | F04D 25/084 |

* cited by examiner

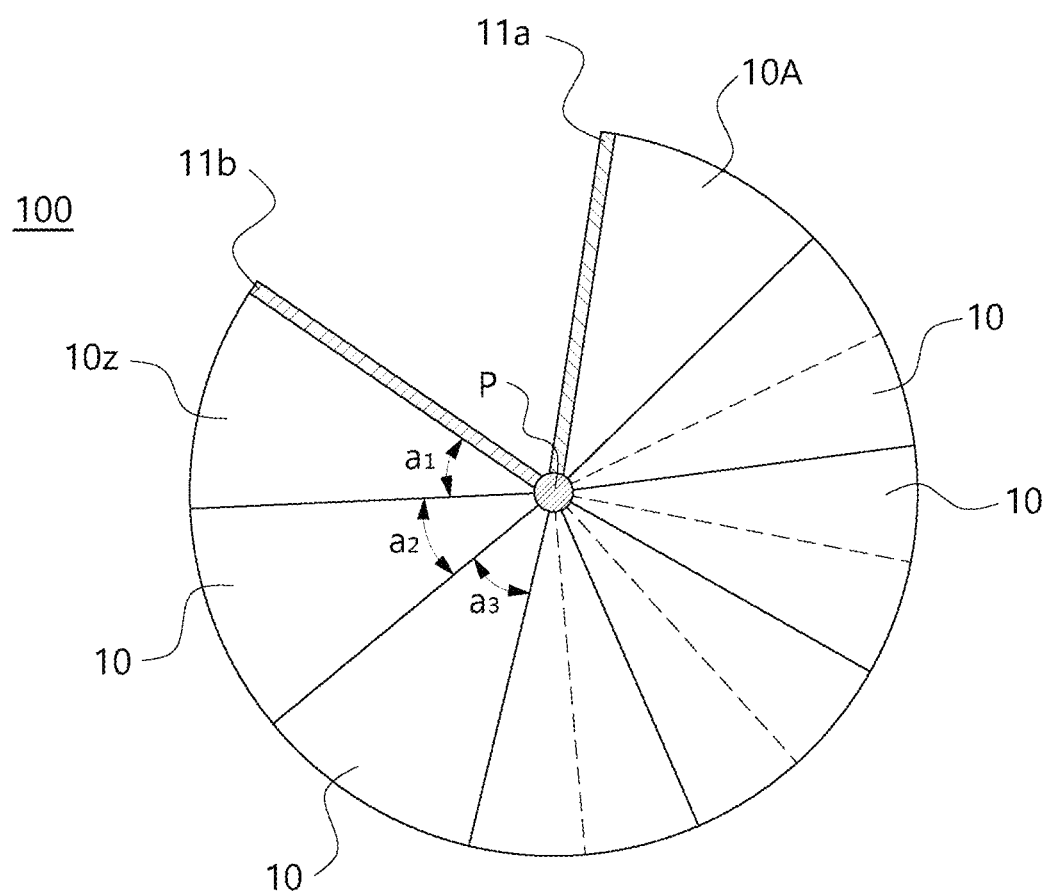

While carrying    For low altitude    For intermediate altitude    For high altitude

GROUND MARKING AERIAL TARGET FOR AERIAL SURVEY TRANSFORMABLE TO HAND-FAN SHAPE

CROSS-REFERENCE TO RELATED APPLICATION

This application claims priority to Korean Patent Application No. 10-2019-0158019, filed on Dec. 2, 2019, and all the benefits accruing therefrom under 35 U.S.C. § 119, the contents of which in its entirety are herein incorporated by reference.

FIELD

The present disclosure relates to a target for aerial survey transformable to hand-fan shape. More particularly, the present disclosure relates to ground marking an aerial target in which a plurality of identification markers is connected through a central axis, and each identification marker is individually foldable and unfoldable.

BACKGROUND

To acquire geographical information from an image captured through a flying object, an aerial target on the ground (i.e. an aerial survey marker) is used. As shown in FIG. 1, the conventional target is formed on a plane in a specific pattern of two colors. The target is made of a sheet of fabric, and its size is fixed.

Meanwhile, since the size of the target is determined based by the flight altitude of the flying object used to capture the image, an operator has to prepare all aerial target of different sizes according to the flight altitude. Additionally, as all the aerial targets need to be prepared, a large volume is occupied due to large numbers, so it is inconvenient to carry and the costs incurred in carrying increase.

In view of the foregoing, there is a need for an easy-to-carry aerial target of variable size and its description will be provided below.

SUMMARY

The present disclosure is directed to providing a target for aerial survey transformable to hand-fan shape.

The present disclosure is further directed to providing an aerial target changing into a sector shape, including a stack of identification markers for the aerial target in different sizes.

The present disclosure is further directed to providing a sector-shaped aerial target that is foldable and unfoldable at various angles.

The technical problems of the present disclosure are not limited to the above-mentioned technical problems, and other technical problems not mentioned herein will be clearly understood by those skilled in the art from the following description.

According to an embodiment of the present disclosure, there is provided a target for aerial survey transformable to hand-fan shape. The aerial target includes a central axis, a first identification marker with one end connected to the central axis and having a first length outwards, and a second identification marker with one end connected to the central axis and having a second length outwards, the second identification marker disposed on the first identification marker, wherein the second length is shorter than the first length, and the first identification marker includes a plurality of first unit areas having a predetermined angle therebetween with respect to the central axis.

Additionally, according to an embodiment of the present disclosure, the aerial target may further include a third identification marker with one end connected to the central axis and having a third length outwards, the third identification marker disposed on the second identification marker, and the third length may be shorter than the second length.

Additionally, according to an embodiment of the present disclosure, the second identification marker may include a plurality of second unit areas having a predetermined angle therebetween with respect to the central axis, and the plurality of second unit areas may have an overlap between adjacent second unit areas.

Additionally, according to an embodiment of the present disclosure, the plurality of first unit areas may have a side-to-side connection with the adjacent first unit areas.

Additionally, according to an embodiment of the present disclosure, the plurality of first unit areas may have no side-to-side connection with the adjacent first unit areas.

Additionally, according to an embodiment of the present disclosure, some of the plurality of first unit areas may have a first protrusion extending in a first direction, the remaining first unit areas may have a second protrusion extending in a second direction, and when the first unit areas are unfolded around the central axis, the overlap between the adjacent first unit areas may be maintained by coupling of the first protrusion and the second protrusion.

Additionally, according to an embodiment of the present disclosure, a magnet may be provided on one side of two first unit areas disposed at an edge among the plurality of first unit areas.

Additionally, according to an embodiment of the present disclosure, a guide rod may be provided on one side of two first unit areas disposed at an edge among the plurality of first unit areas, and one side of one unit area of the second identification marker may be connected to the guide rod.

Additionally, according to an embodiment of the present disclosure, the first unit areas may increase in width from the central axis outwards.

Additionally, according to an embodiment of the present disclosure, an outer periphery of the first unit areas may be curved or linear.

The present disclosure may provide a target for aerial survey transformable to hand-fan shape.

The present disclosure may provide a device changing into a sector shape, including a stack of aerial targets of different sizes.

The present disclosure may provide a sector-shaped aerial target that is foldable and unfoldable at various angles.

The effects of the present disclosure are not limited to the above-mentioned effects, and other effects not mentioned herein will be clearly understood by those skilled in the art from the appended claims.

BRIEF DESCRIPTION OF DRAWINGS

FIG. 4 shows an example of a first identification marker according to an embodiment of the present disclosure.

DETAILED DESCRIPTION OF THE EMBODIMENTS

Hereinafter, the preferred embodiments of the present disclosure will be described in detail with reference to the accompanying drawings. The detailed description disclosed below along with the accompanying drawings is made to describe exemplary embodiments of the present disclosure, but not intended to represent only one embodiment in which the present disclosure is carried out. The following detailed description includes the detailed subject matter to provide a full and complete understanding of the present disclosure. However, those skilled in the art understand that the present disclosure may be carried out without such detailed subject matter.

The following embodiments are a predetermined combination of elements and features of the present disclosure. Unless otherwise expressly stated herein, each element or feature may be considered as optional. Each element or feature may operate in non-combination with other elements or features. Additionally, the embodiments of the present disclosure may comprise a combination of some elements and/or features. The order of the operations described in the embodiments of the present disclosure may change. Some elements or features of an embodiment may be included in other embodiments, or replaced with the equivalent elements or features of other embodiments.

The particular terms as used herein are provided to help understanding of the present disclosure, and the use of these particular terms may be modified into different forms without departing from the technical spirit of the present disclosure.

In some cases, to avoid ambiguity in the concept of the present disclosure, known structures and devices are omitted herein, or they are shown in the form of a block diagram based on the essential functions of each structure and device. Additionally, the same element is described using the same reference sign throughout the specification.

Additionally, the terms such as first and/or second may be used to describe various elements, but they should not be limited by the elements. These terms are used to distinguish an element from another, and for example, a first element may be referred to as a second element, and likewise, a second element may be referred to as a first element without departing from the scope of protection based on the concept of the present disclosure.

Additionally, the term "comprising" when used in this specification, specifies the presence of stated elements, but does not preclude the presence or addition of one or more other elements unless stated to the contrary. Additionally, the term "unit" as used herein indicates a processing unit of at least one function or operation, and this may be implemented by a combination of hardware and/or software.

Figure 1:
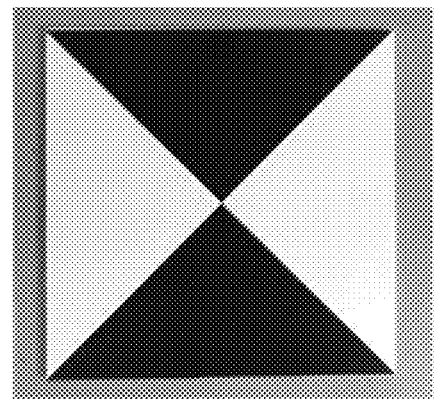
FIG. 1 is a diagram showing the conventional aerial target.
Figure 2:
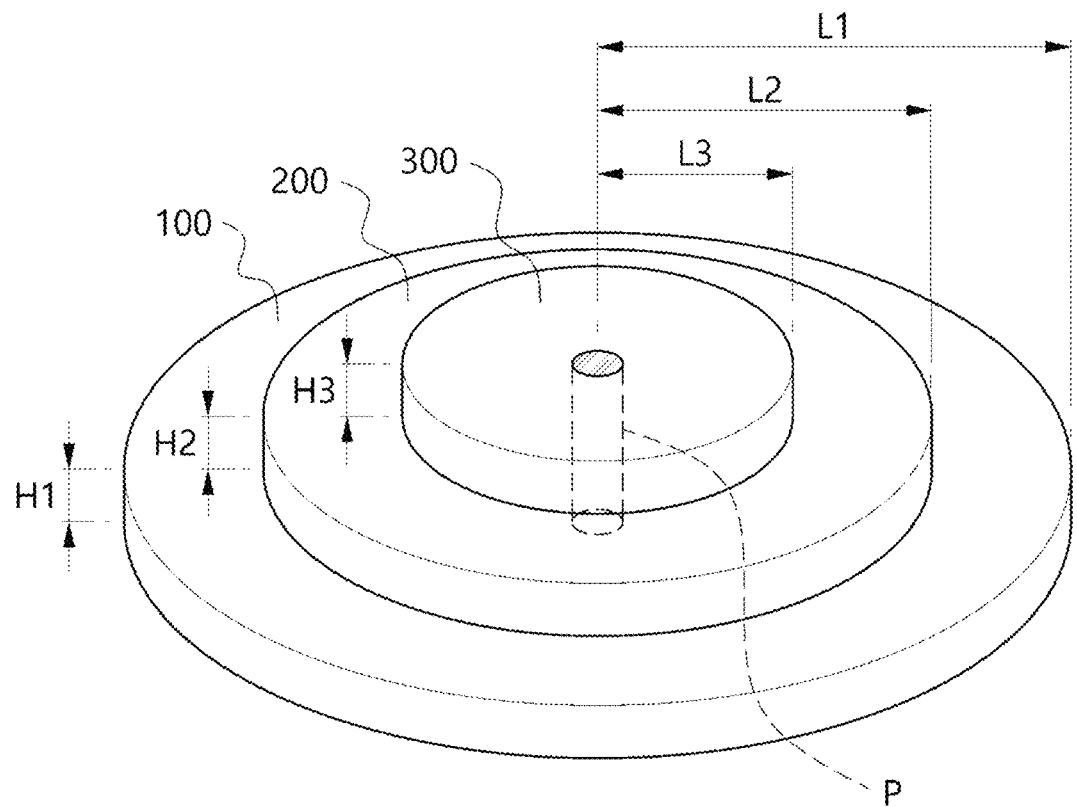
FIG. 2 is a schematic diagram of a target for aerial survey transformable to hand-fan shape according to an embodiment of the present disclosure.

FIG. 2 is a schematic diagram of a target for aerial survey transformable to hand-fan shape according to an embodiment of the present disclosure. Referring to FIG. 2, the aerial target 1000 includes a central axis P, a first identification marker 100, a second identification marker 200 and a third identification marker 300. In other embodiment, at least one of the first to third identification markers 100-300 may be excluded.

Figure 3A:
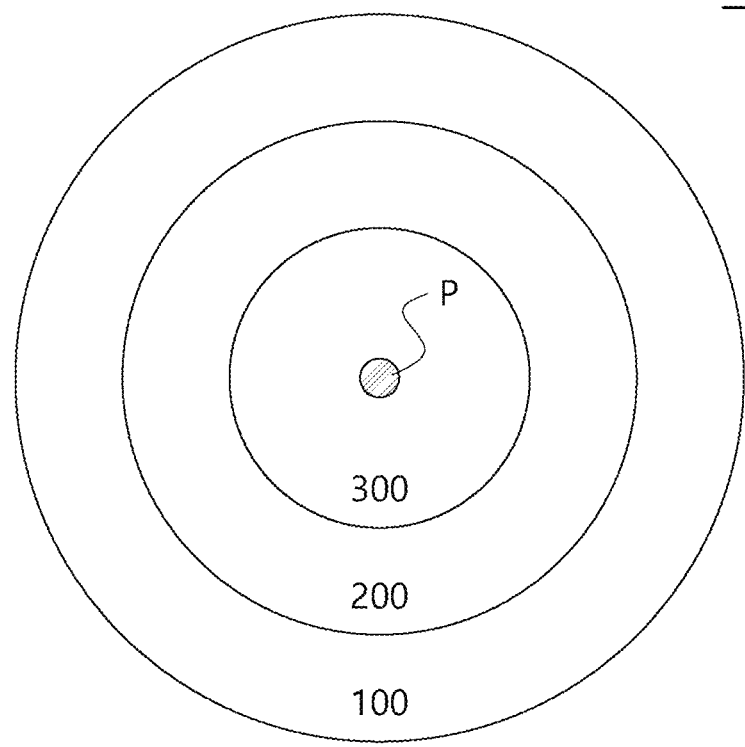
FIG. 3A is a plane view of an aerial target changing into a sector shape according to an embodiment of the present disclosure.
Figure 3B:
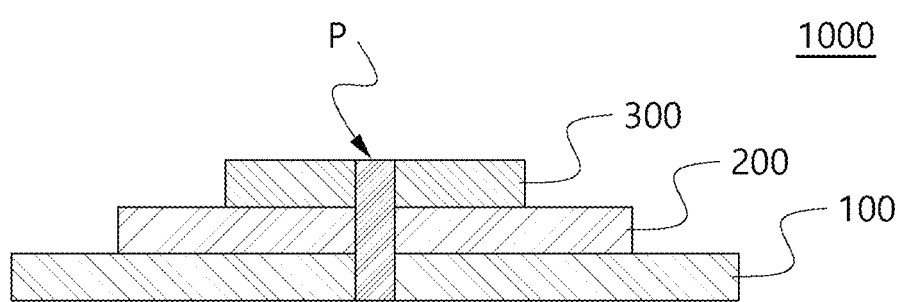
FIG. 3B is a side view of an aerial target changing into a sector shape according to an embodiment of the present disclosure.

FIGS. 3A and 3B are a plane view and a side view of the aerial target 1000 changing into a sector shape according to an embodiment of the present disclosure.

The aerial target shown in FIGS. 2, 3A and 3B is such that each identification marker is unfolded to the maximum extent, and the aerial target may change into a sector shape, and further to a rod shape. The mechanism of the aerial target changing from a rod shape to a sector shape and then a circle shape and the structure therefor will be described below.

In an embodiment, the first identification marker 100 may be configured such that one end is connected to the central axis P and it has a first length L1 outwards (the outside of the circle). Additionally, the second identification marker 200 may be configured such that one end is connected to the central axis P and it has a second length L2 outwards (the outside of the circle). Additionally, the third identification marker 300 may be configured such that one end is connected to the central axis P and it has a third length L3 outwards (the outside of the circle). Here, the first length L1 may be longer than the second length L2, and the second length L2 may be longer than the third length L3. That is, when unfolded to the maximum extent, the first to third identification markers 100-300 may have a circular (or approximately circular) cross section, and the radii of the circles may be smaller in a sequential order. Accordingly, as shown in FIG. 2, a stepped shape may be presented.

In an embodiment, the first length L1 may have the radius of 50 cm for high altitude, and the second length L2 and the third length L3 may have the radius of 30 cm and 15 cm respectively, but the present disclosure is not limited thereto.

Additionally, the height H1-H3 of each identification marker 100-300 may be a very small value, compared to the length (radius). For example, the height H1-H3 of each identification marker 100-300 is preferably 1 cm or less, but is not limited thereto. Since the aerial target image is captured in the air, each identification marker having a large height may be undesirable. It is because the shadow of the upper identification marker falls on the lower identification marker, which may adversely affect the processing of the aerial target image. Accordingly, the present disclosure may be designed such that the height value of each identification marker is minimum. To this end, the structure of each identification marker is designed such that each identification marker is foldable and unfoldable, and the height value is not large when each identification marker is unfolded to the maximum extent.

FIG. 4 shows an example of the first identification marker according to an embodiment of the present disclosure. A description of the structure and function of the identification marker shown in FIG. 4 may be equally applied to the other identification markers (the second and third identification markers). To avoid redundancy, although the following description is made based on the first identification marker 100, the description of the first identification marker 100 may be equally applied to the second and third identification markers 200, 300. In the following description, the first identification marker 100 of FIG. 4 will be referred to as an identification marker.

Referring to FIG. 4, the identification marker 100 may include a plurality of first unit areas 10 having a predetermined angle therebetween with respect to the central axis P. The plurality of first unit areas may have an overlap between adjacent first unit areas.

Each unit area may increase in width from the central axis P outwards. Additionally, the outer periphery of the unit areas may be curved or linear. That is, the outer periphery of the unit areas may be a sector shape or a right triangle shape, but is not limited thereto.

Each unit area may include a predetermined color area thereon. When each unit area is unfolded to the maximum extent with respect to the central axis, the color areas are seen on top, and on the basis of the shape formed by the color areas, the image of each identification marker may be analyzed. For example, the shape formed by the color areas may be such that a circle is divided into four and each area is colored in white or black, but is not limited thereto.

In FIG. 4, among the plurality of first unit areas 10, the first unit areas disposed at the edge are indicated using different reference signs 10A and 10Z. In FIG. 4, the dashed line indicates a folding line. Each unit area may be distinguished on the basis of this line, but the present disclosure is not limited thereto, and a detailed description will be provided below.

As shown in FIG. 4, the predetermined angles a1, a2, a3 . . . may be equal or some of them may be different. However, in a preferred embodiment, the predetermined angles may have the same value. Meanwhile, the sum of the angles between the unit areas that make up one identification marker 100 may be 360° or greater. In case that the sum of the angles between the unit areas is greater than 360°, when each unit area is be unfolded with an overlap between parts of the unit areas, there may be no spacing between each unit area.

FIG. 4 shows that the identification marker 100 is not in fully unfolded state. When unfolded to the maximum extent, the edge unit areas 10A, 10Z will come into contact with each other. Although not shown in the plane view of FIG. 4, some unit areas may overlap with adjacent unit areas.

Figure 5:
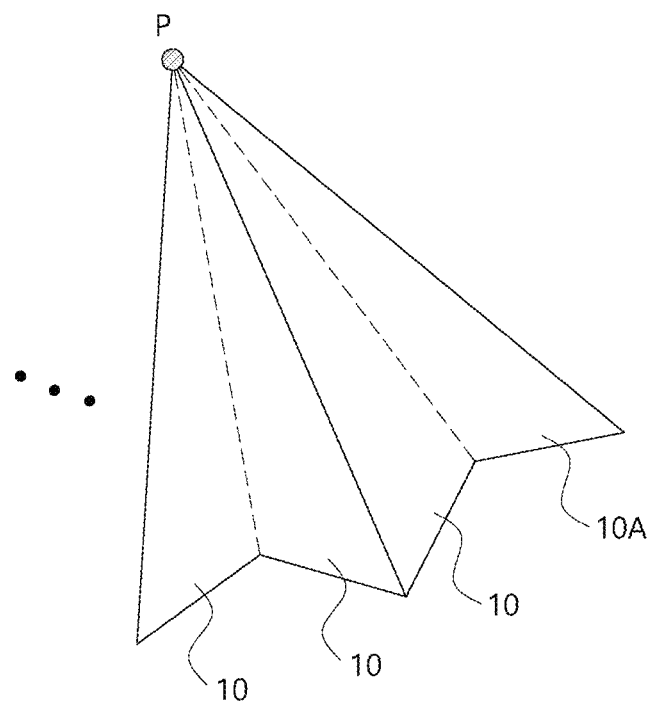
FIG. 5 shows a relationship between unit areas according to an embodiment of the present disclosure.

FIG. 5 shows a relationship between the unit areas according to an embodiment of the present disclosure. Referring to FIG. 5, the plurality of unit areas has a side-to-side connection with the adjacent unit areas. However, as the folding line (indicated by the dashed line) is formed at the seam, each unit area may overlap with the adjacent unit areas. Accordingly, when the unit areas are folded and unfolded as if a traditional fan does so, the cross-sectional shape of the first identification marker may change from a circle shape to a sector shape and a linear shape. When each unit area is unfolded, the shape of the identification marker may change closely to a linear shape (a straight line) when viewed from the top. In other words, the aerial target (marker) may transform the shape as hand-fan shape.

For example, a user may unfold the identification marker 100 by moving the unit areas 10A, 10Z disposed at the edge to bring their sides into contact with each other, and fold the identification marker 100 by moving the unit areas 10A, 10Z disposed at the edge with an overlap between them. In this instance, when folded along the direction of the folding line between each unit area, each unit area may be folded at a preset location in a sequential order. As described above, it is necessary to fold along the folding line.

Figure 6:
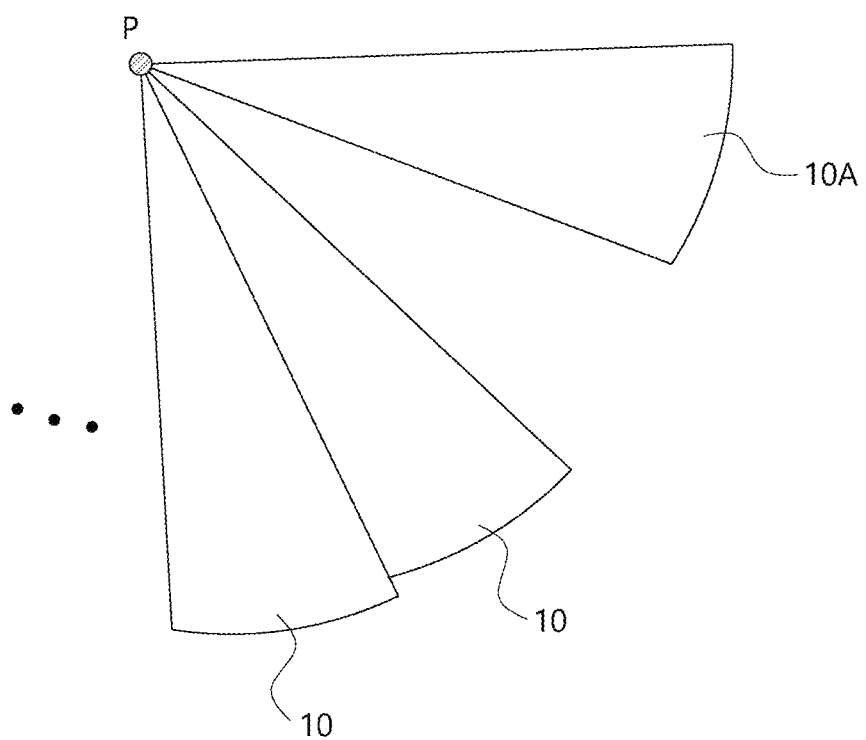
FIG. 6 shows a relationship between unit areas according to another embodiment of the present disclosure.

FIG. 6 shows a relationship between the unit areas according to another embodiment of the present disclosure. In this embodiment, the plurality of unit areas may not be connected to the adjacent unit areas. According to this embodiment, it is not necessary to fold along the folding line as described above in the embodiment of FIG. 5. For example, the plurality of unit areas is connected to one central axis P, but may be independent of each other. That is, the sides of the unit areas may not be connected to each other as described in FIG. 5, and they may be separated from each other. In this case, when the plurality of unit areas overlaps, each unit area may be stacked.

Referring to FIG. 6, the edge unit area 10A and the adjacent unit area are unfolded with a spacing therebetween so that their sides are not in contact with each other. As opposed to the embodiment of FIG. 5, each unit area is not connected to the adjacent unit area, and thus may have the spacing therebetween. The spacing acts as noise in the image, so it is important to prevent the spacing from being created. For example, the user may manually place each unit area to prevent the spacing from being created. Meanwhile, to make this task easier, each unit area may have at least one protrusion.

Figure 7:
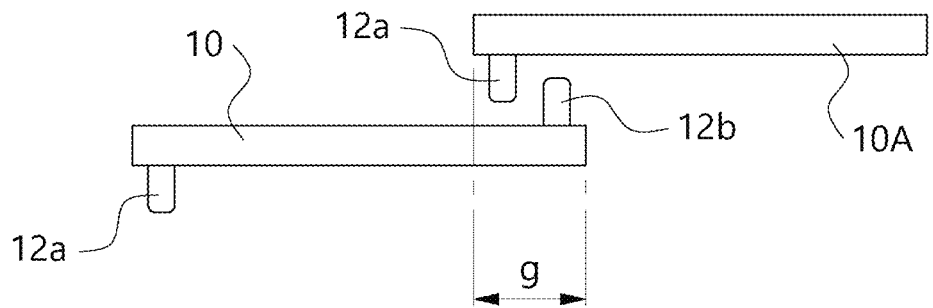
FIG. 7 shows unit areas including protrusions according to an embodiment of the present disclosure.

FIG. 7 shows the unit areas including the protrusions according to an embodiment of the present disclosure. Referring to FIG. 7, some of the plurality of unit areas may have a first protrusion 12a extending in a first direction, and the remaining unit areas may have a second protrusion 12b extending in a second direction. Here, the first direction and the second direction may be opposite to each other, and for example, the first direction and the second direction may be the upward direction and the downward direction. In another embodiment, at least some unit areas may include both the first protrusion 12a and the second protrusion 12b. In this case, the first protrusion 12a and the second protrusion 12b may be disposed on each side of the unit area. When the first protrusion 12a and the second protrusion 12b are provided, as shown in FIG. 7, when each unit area is unfolded, an overlap between adjacent unit areas may be maintained by coupling of the first protrusion 12a and the second protrusion 12b. That is, there may be no such spacing. When the unit areas are configured to have an overlap between predetermined parts of adjacent unit areas even in fully unfolded state, the sum of the angles between each unit area will be greater than 360°.

Referring back to FIG. 4, in an embodiment of the present disclosure, magnets 11a, 11b may be provided on one side of the unit areas 10A, 10Z disposed at the edge among the plurality of unit areas. It is necessary that when unfolded for use as the aerial target, the identification marker has a circular cross section as a whole, and the corresponding cross section has a preset fixed pattern. That is, each unit area needs to be repeatedly positioned at the same fixed location. If the identification marker is fully unfolded but some unit areas are folded again, the aerial target cannot perform its function. To this end, the magnets 11a, 11b are provided on one side of the two unit areas disposed at the edge, and each magnet 11a, 11b comes into contact with each other through the forces of attraction, thereby keeping the cross section of the identification marker in a circular shape. On the other hand, when the identification marker is folded, the unit areas may be kept in folded state by the contact of each magnet 11a, 11b to prevent the folded unit areas from being unfolded again during storage.

Figure 8:
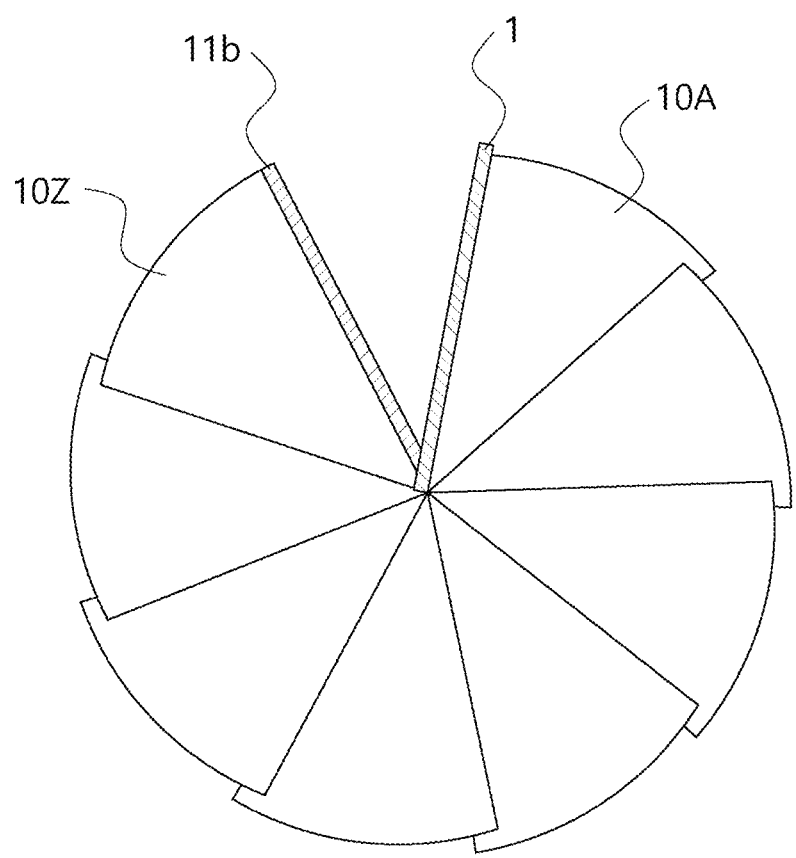
FIG. 8 shows an identification marker according to an embodiment of the present disclosure.

FIG. 8 shows the identification marker according to an embodiment of the present disclosure. In an embodiment, a guide rod 1 may be provided on one side of the unit area 10A or 10Z disposed at the edge among the plurality of unit areas of the identification marker. The guide rod 1 may be formed separately from or integrally with the above-described magnets 11a, 11b. The side of each unit area of two or more identification markers may be connected to the guide rod 1. At least one of the unit areas of each identification marker may be fixed to the guide rod.

For example, the direction of the guide rod 1 may be perpendicular to the direction of the central axis P. The central axis P acts as a center point of each identification marker, and one end of the unit areas of each identification marker is connected to the central axis P. In contrast, the guide rod 1 is disposed at the line connecting the center of each identification marker to the outer peripheral area, and functions to fix at least one unit area of each identification marker to the same location. Referring to FIG. 8, the unit area 10A is fixed to the guide rod 1, while the unit area 10Z may not be fixed to the guide rod 1. Accordingly, the user may fold or unfold the identification marker by moving the unit area 10Z with respect to the guide rod 1.

Additionally, FIG. 8 shows each unit area having an overlap between parts of the unit areas. Accordingly, the outer periphery is unevenly connected, and a step is formed at the boundary of the unit areas. The step may disappear when the magnet 11b and a guide 1 are brought into contact with each other.

Figure 9A:
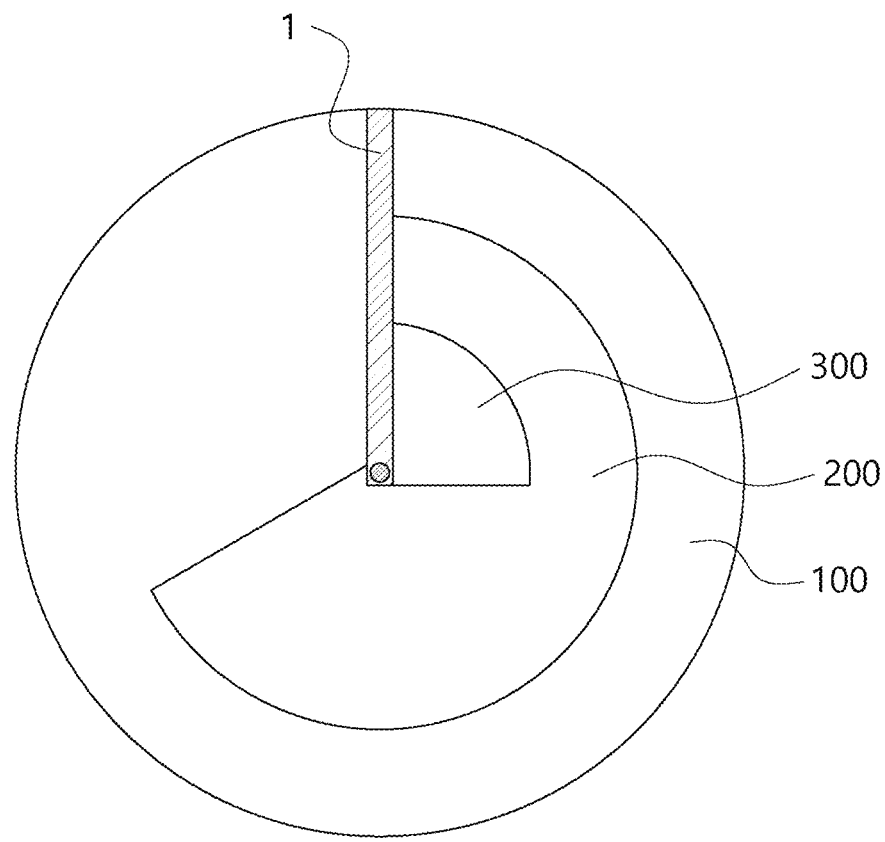
FIG. 9A is a plane view showing each identification marker in unfolded state at different angles according to an embodiment of the present disclosure.

FIG. 9A is a plane view showing each identification marker unfolded at different angles according to an embodiment of the present disclosure. As shown in FIG. 9A, parts of each identification marker 100-300 are fixed to the guide rod 1, and each identification marker may be unfolded in the clockwise direction with respect to the guide rod 1. The first identification marker 100 is fully unfolded into the shape of a circle, the second identification marker 200 is unfolded at about 230°, and the third identification marker 300 is unfolded at about 90°.

Figure 9B:
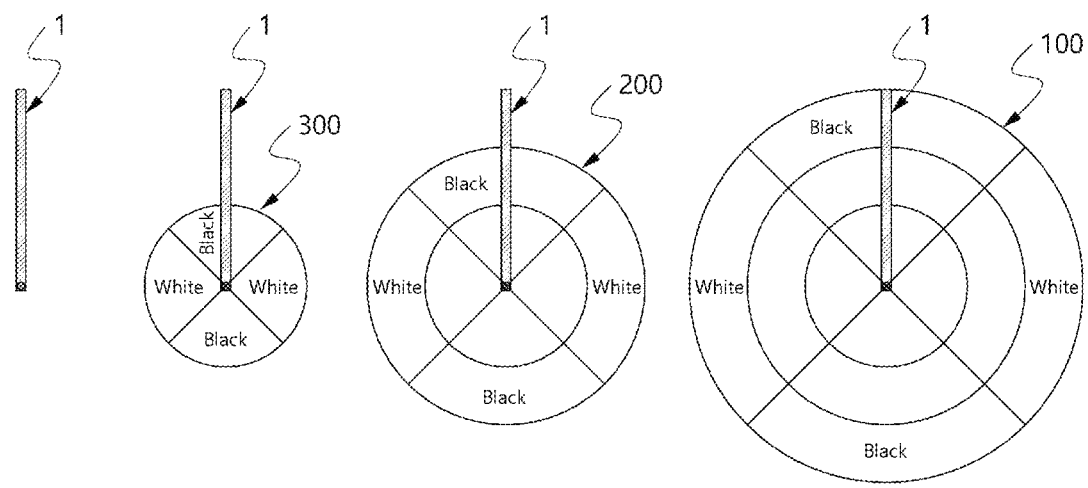
FIG. 9B is a plane view of an aerial target for each usage according to an embodiment of the present disclosure.

FIG. 9B is a plane view of the aerial target for each usage according to an embodiment of the present disclosure. After selecting an identification marker necessary for the purpose and unfolding and fixing it, the user may place the aerial target at a preset geographical location. That is, in a region in which the aerial target for high altitude is installed, installation may be performed after placing the second and third identification markers 200, 300 in fully folded state to the guide rod 1 and the first identification marker 100 in fully unfolded state.

Additionally, the aerial target according to an embodiment of the present disclosure can mark the plurality of identification markers having different radii in an overlapping manner, and thus it is possible to make a plurality of color combinations and shapes using one aerial target set (including three identification markers in the present disclosure). That is, a specific identifier may be given to the angle at which each identification marker is unfolded. For example, an aerial target A including an identification marker for low altitude unfolded at 90°, an identification marker for intermediate altitude unfolded at 180°, and an identification marker for high altitude unfolded at 240° and an aerial target B including an identification marker for low altitude unfolded at 180°, an identification marker for intermediate altitude unfolded at 240°, and an identification marker for high altitude unfolded at 360° will be identified as different ones. Accordingly, it is possible to easily implement various types of aerial targets using one signal without needing to carry multiple types of aerial targets.

Figure 10:
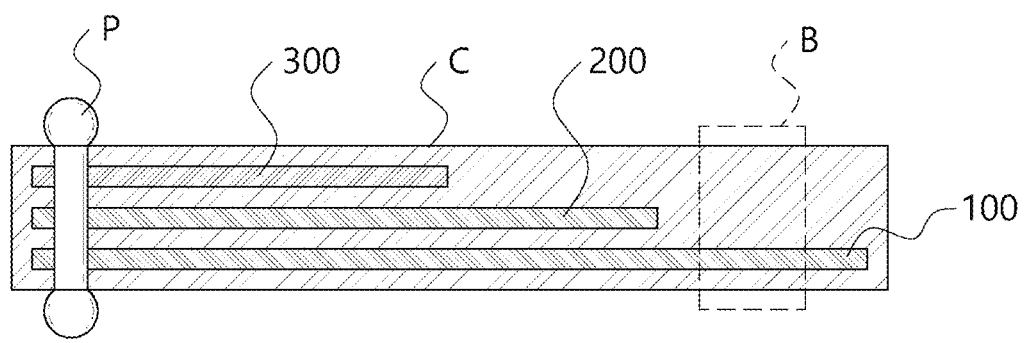
FIG. 10 is a side cutaway view of an aerial target in folded state according to an embodiment of the present disclosure.

FIG. 10 is a side cutaway view of the aerial target in folded state according to an embodiment of the present disclosure. As described above, the identification markers that make up the aerial target of the present disclosure are foldable and unfoldable. When each identification marker is all folded, the volume shrinks, which makes it convenient to carry. Referring to FIG. 10, the plurality of identification markers 100-300 may be fixed with respect to the vertical axis of the central axis P, and encased by a casing element C. The casing element C may function to protect the identification markers while carrying the aerial target. The material of the casing element C may be a stiff material (for example, metal, nonmetal, synthetic fiber) that has a definite shape, or a fabric material that does not have a definite shape. When the casing element C is made of a fabric material, a binder B may be further provided to fix the identification markers disposed at the opposite end to the central axis P.

Figure 11:
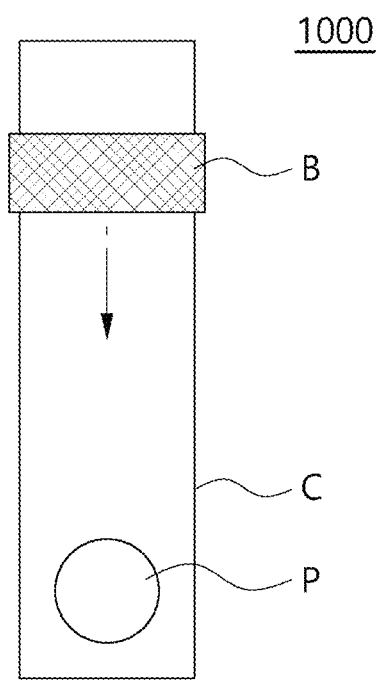
FIG. 11 is a plane view of an aerial target (1000) in folded state according to an embodiment of the present disclosure.

FIG. 11 is a plane view of the aerial target 1000 in folded state according to an embodiment of the present disclosure. Referring to FIG. 11, the binder B described above in FIG. 10 is shown, and after moving the binder B toward the central axis P and opening the casing element C, the identification markers in the casing element C will be unfolded. Additionally, after use, one end (the opposite end to the central axis) of the identification markers disposed in the casing element C may be fixed by moving the binder B outwards (in a direction opposite to the direction of arrow in FIG. 11).

The detailed description of the preferred embodiment of the present disclosure disclosed as described above is provided to allow those skilled in the art to embody and practice the present disclosure. While the foregoing description has been made with reference to the preferred embodiments of the present disclosure, it should be understood that a variety of modifications and changes may be made thereto by those having ordinary skill in the corresponding technical field without departing from the spirit and scope of the present disclosure. Accordingly, the present disclosure is not limited to the disclosed embodiments, and is intended to give the broadest scope corresponding to the disclosed principles and new features. Additionally, while the preferred embodiments of the present disclosure have been hereinabove shown and described, the present disclosure is not limited to the disclosed specific embodiment, many variations may be made thereto by those having ordinary skill in the technical field pertaining to the present disclosure without departing from the subject matter of the present disclosure defined in the appended claims, and such variations should not be individually understood from the technical spirit or scope of the present disclosure.

The invention claimed is:

1. A target for aerial survey transformable to hand-fan shape, the target comprising:
   a central axis;
   a first identification marker with one end connected to the central axis, and having a first length outwards;
   a second identification marker with one end connected to the central axis, and having a second length outwards, the second identification marker disposed on the first identification marker;
   a third identification marker with one end connected to the central axis, and having a third length outwards, the third identification marker disposed on the second identification marker, and the third length is shorter than the second length;

a casing element having a fourth length outward which is same or longer than the first length, and configured to encase the first identification marker, the second identification marker and the third identification marker, wherein the first identification marker, the second identification marker and the third identification marker are configured to be fixed with respect to a vertical axis of the central axis and encased by the casing element; and a binder being disposed at an opposite end to the central axis and configured to fix the first identification marker, the second identification marker and the third identification marker by being moved outwards from the central axis, wherein after moving the binder toward the central axis and opening the casing element, the first identification marker, the second identification marker and the third identification marker in the casing element are capable to be unfolded, wherein the second length is shorter than the first length, the first identification marker includes a plurality of first unit areas having a predetermined angle therebetween with respect to the central axis, and the plurality of first unit areas has an overlap between adjacent first unit areas, wherein some of the plurality of first unit areas have a first protrusion extending in a upward direction, and the remaining first unit areas have a second protrusion extending in a downward direction, when the first unit areas are unfolded around the central axis, the overlap between the adjacent first unit areas is maintained by coupling of the first protrusion and the second protrusion, wherein the upward direction of the first protrusion and the downward direction of the second protrusion are opposite to each other, wherein at least some of the plurality of first unit areas include both the first protrusion and the second protrusion, the first protrusion is disposed on one side of the first unit area, and the second protrusion is disposed on the other side of the first unit area, wherein the upward direction of the first protrusion is an upward direction, and the downward direction of the second protrusion is a downward direction, wherein a first magnet is provided on one side of two first unit areas disposed at an edge among the plurality of first unit areas, wherein when the first unit areas are unfolded or folded around the central axis, an unfolded state or a folded state is maintained by a contact of the two first unit areas on which the first magnet is provided, wherein a guide rod is integrally formed with the first magnet of at least one of the two first unit areas, wherein the second identification marker includes a plurality of second unit areas having a predetermined angle therebetween with respect to the central axis, and the plurality of second unit areas has an overlap between adjacent second unit areas, wherein some of the plurality of second unit areas have a third protrusion extending in the upward direction, and the remaining second unit areas have a fourth protrusion extending in the downward direction, when the second unit areas are unfolded around the central axis, the overlap between the adjacent second unit areas is maintained by coupling of the third protrusion and the fourth protrusion, wherein at least some of the plurality of second unit areas include both the third protrusion and the fourth protrusion, the third protrusion is disposed on one side of the second unit area, and the fourth protrusion is disposed on the other side of the second unit area, wherein a second magnet is provided on one side of two second unit areas disposed at an edge among the plurality of second unit areas, wherein when the second unit areas are unfolded or folded around the central axis, an unfolded state or a folded state is maintained by a contact of the two second unit areas on which the second magnet is provided, wherein the guide rod is integrally formed further with the second magnet of at least one of the two second unit areas, wherein the third identification marker includes a plurality of third unit areas having a predetermined angle therebetween with respect to the central axis, and the plurality of third unit areas has an overlap between adjacent third unit areas, wherein some of the plurality of third unit areas have a fifth protrusion extending in the upward direction, and the remaining third unit areas have a sixth protrusion extending in the downward direction, when the third unit areas are unfolded around the central axis, the overlap between the adjacent third unit areas is maintained by coupling of the fifth protrusion and the sixth protrusion, wherein at least some of the plurality of third unit areas include both the fifth protrusion and the sixth protrusion, the fifth protrusion is disposed on one side of the third unit area, and the sixth protrusion is disposed on the other side of the third unit area, wherein a third magnet is provided on one side of two third unit areas disposed at an edge among the plurality of third unit areas, wherein when the third unit areas are unfolded or folded around the central axis, an unfolded state or a folded state is maintained by a contact of the two third unit areas on which the third magnet is provided, wherein the guide rod is integrally formed further with the third magnet of at least one of the two third unit areas, wherein the first identification marker, the second identification and the third identification marker are configured to be attached to the guide rod, and the first identification marker, the second identification and the third identification marker are further configured to be unfolded around the central axis in a clockwise direction or a counterclockwise direction with respect to the guide rod, wherein the first identification marker is further configured to be unfolded for a first altitude of an aerial target, the second identification marker is further configured to be unfolded for a second altitude of the aerial target, and the third identification marker is further configured to be unfolded for a third altitude of the aerial target, wherein the first altitude is higher than the second altitude, and the second altitude is higher than the third altitude, wherein surfaces of the unfolded first identification marker, the unfolded second identification marker, and the unfolded third identification marker are configured to have a predetermined color pattern with at least two colors such that a circle divided into four and each area is colored in white or black, wherein the second identification marker includes a plurality of second unit areas having a predetermined angle therebetween with respect to the central axis, and the plurality of second unit areas has an overlap between adjacent second unit areas, wherein the plurality of first unit areas has no side-to-side connection with the adjacent first unit areas, wherein a guide rod is provided on one side of two first unit areas disposed at an edge among the plurality of first unit areas, and one side of one unit area of the second identification marker is connected to the guide rod, wherein the first unit areas increase in width from the central axis outwards, wherein an outer periphery of the first unit areas is curved, wherein the first length is 50 cm, the second length is 30 cm, and the third length is 15 cm, wherein a height of the first identification marker, the second identification marker and the third identification marker are 1 cm.

2. A method of an aerial survey with a target transformable to hand-fan shape, the method comprising:

installing a first identification marker for a first altitude of an aerial target by unfolding the first identification marker around a central axis in a clockwise direction or a counterclockwise direction with respect to a guide rod;

installing a second identification marker for a second altitude of the aerial target by unfolding the second identification marker around the central axis in the clockwise direction or the counterclockwise direction with respect to the guide rod; and installing a third identification marker for a third altitude of the aerial target by unfolding the third identification marker around the central axis in the clockwise direction or the counterclockwise direction with respect to the guide rod, wherein:

the first altitude is higher than the second altitude;

the second altitude is higher than the third altitude;

the first identification marker and the second identification marker are attached to the guide rod, and the first identification marker [[and]] the second identification marker and the third identification marker are capable to be unfolded around the central axis in the clockwise direction or the counterclockwise direction with respect to the guide rod;

the first identification marker with one end connected to the central axis, and having a first length outwards;

the second identification marker with one end connected to the central axis, and having a second length outwards, the second identification marker disposed on the first identification marker;

a third identification marker with one end connected to the central axis, and having a third length outwards, the third identification marker disposed on the second identification marker, and the third length is shorter than the second length;

a casing element having a fourth length outward which is same or longer than the first length, and configured to encase the first identification marker, the second identification marker and the third identification marker, wherein the first identification marker, the second identification marker and the third identification marker are configured to be fixed with respect to a vertical axis of the central axis and encased by the casing element; and a binder being disposed at an opposite end to the central axis and configured to fix the first identification marker, the second identification marker and the third identification marker by being moved outwards from the central axis, wherein after moving the binder toward the central axis and opening the casing element, the first identification marker, the second identification marker and the third identification marker in the casing element are capable to be unfolded, the second length is shorter than the first length;

the first identification marker includes a plurality of first unit areas having a predetermined angle therebetween with respect to the central axis;

the plurality of first unit areas has an overlap between adjacent first unit areas;

some of the plurality of first unit areas have a first protrusion extending in a upward direction, and the remaining first unit areas have a second protrusion extending in a downward direction;

when the first unit areas are unfolded around the central axis, the overlap between the adjacent first unit areas is maintained by coupling of the first protrusion and the second protrusion;

the upward direction of the first protrusion and the downward direction of the second protrusion are opposite to each other;

at least some of the plurality of first unit areas include both the first protrusion and the second protrusion, the first protrusion is disposed on one side of the first unit area, and the second protrusion is disposed on the other side of the first unit area;

the upward direction of the first protrusion is an upward direction, and the downward direction of the second protrusion is a downward direction;

a first magnet is provided on one side of two first unit areas disposed at an edge among the plurality of first unit areas;

when the first unit areas are unfolded or folded around the central axis, an unfolded state or a folded state is maintained by a contact of the two first unit areas on which the first magnet is provided;

a guide rod is integrally formed with the first magnet of at least one of the two first unit areas, the second identification marker includes a plurality of second unit areas having a predetermined angle therebetween with respect to the central axis;

the plurality of second unit areas has an overlap between adjacent second unit areas;

some of the plurality of second unit areas have a third protrusion extending in the upward direction, and the remaining second unit areas have a fourth protrusion extending in the downward direction;

when the second unit areas are unfolded around the central axis, the overlap between the adjacent second unit areas is maintained by coupling of the third protrusion and the fourth protrusion;

at least some of the plurality of second unit areas include both the third protrusion and the fourth protrusion, the third protrusion is disposed on one side of the second unit area, and the fourth protrusion is disposed on the other side of the second unit area;

a second magnet is provided on one side of two second unit areas disposed at an edge among the plurality of second unit areas;

when the second unit areas are unfolded or folded around the central axis, an unfolded state or a folded state is maintained by a contact of the two second unit areas on which the second magnet is provided;

the guide rod is integrally formed further with the second magnet of at least one of the two second unit areas;

the third identification marker includes a plurality of third unit areas having a predetermined angle therebetween with respect to the central axis;

the plurality of third unit areas has an overlap between adjacent third unit areas;

some of the plurality of third unit areas have a fifth protrusion extending in the upward direction, and the remaining third unit areas have a sixth protrusion extending in the downward direction;

when the third unit areas are unfolded around the central axis, the overlap between the adjacent third unit areas is maintained by coupling of the fifth protrusion and the sixth protrusion;

at least some of the plurality of third unit areas include both the fifth protrusion and the sixth protrusion, the fifth protrusion is disposed on one side of the third unit area, and the sixth protrusion is disposed on the other side of the third unit area;

a third magnet is provided on one side of two third unit areas disposed at an edge among the plurality of third unit areas;

when the third unit areas are unfolded or folded around the central axis, an unfolded state or a folded state is maintained by a contact of the two third unit areas on which the third magnet is provided;

the guide rod is integrally formed further with the third magnet of at least one of the two third unit areas;

the first identification marker, the second identification and the third identification marker are configured to be attached to the guide rod, and the first identification marker, the second identification and the third identification marker are further configured to be unfolded around the central axis in a clockwise direction or a counterclockwise direction with respect to the guide rod;

the first identification marker is further configured to be unfolded for a first altitude of an aerial target, the second identification marker is further configured to be unfolded for a second altitude of the aerial target, and the third identification marker is further configured to be unfolded for a third altitude of the aerial target;

the first altitude is higher than the second altitude, and the second altitude is higher than the third altitude;

surfaces of the unfolded first identification marker, the unfolded second identification marker, and the unfolded third identification marker are configured to have a predetermined color pattern with at least two colors such that a circle divided into four and each area is colored in white or black;

the second identification marker includes a plurality of second unit areas having a predetermined angle therebetween with respect to the central axis, and the plurality of second unit areas has an overlap between adjacent second unit areas;

the plurality of first unit areas has no side-to-side connection with the adjacent first unit areas, a guide rod is provided on one side of two first unit areas disposed at an edge among the plurality of first unit areas, and one side of one unit area of the second identification marker is connected to the guide rod;

the first unit areas increase in width from the central axis outwards;

an outer periphery of the first unit areas is curved;

the first length is 50 cm, the second length is 30 cm, and the third length is 15 cm; and a height of the first identification marker, the second identification marker and the third identification marker are 1 cm.

* * * * *